United States Patent [19]

LeMessurier

[11] Patent Number: 4,597,357
[45] Date of Patent: Jul. 1, 1986

[54] BIRD FRIGHTENING DEVICES

[76] Inventor: David H. LeMessurier, 40 Bevington Road, Glenunga, South Australia, Australia, 5064

[21] Appl. No.: 669,993

[22] Filed: Nov. 9, 1984

[30] Foreign Application Priority Data

Nov. 11, 1983 [AU] Australia .............................. PG2345

[51] Int. Cl.⁴ .......................... A63H 3/00; G09F 7/22
[52] U.S. Cl. ..................... 116/22 A; 40/479; 428/16; 428/126
[58] Field of Search ............... 116/22 A; 428/16, 121, 428/124, 126; 40/479

[56] References Cited

U.S. PATENT DOCUMENTS

| 1,287,968 | 12/1918 | Greenleaf | 428/11 X |
| 2,488,509 | 11/1949 | Lewin | 428/16 X |
| 2,722,195 | 11/1955 | Rockafeller | 428/192 X |
| 3,085,545 | 4/1963 | Ore | 428/16 X |
| 4,131,079 | 12/1978 | Rousseau, Jr. et al. | 428/16 X |

FOREIGN PATENT DOCUMENTS

| 111322 | 9/1940 | Australia . |
| 128053 | 7/1948 | Australia . |
| 476266 | 12/1937 | United Kingdom . |

OTHER PUBLICATIONS

Page 377 of "Anglers' Omnibus", edited by Rodger Hungerford, Pollard Publishing Company, 7 Selwyn St., Wollstone Craft, NSW 2065.

Primary Examiner—Henry F. Epstein
Attorney, Agent, or Firm—Oldham, Oldham & Weber Co.

[57] ABSTRACT

A Bird Scare comprised of a sheet of aluminium supported by a swivel and having both a twist and turned edges to enable sensitive response to effect rotation in very light rising air as well as rotation on gentle conventional wind and high wind conditions. The sheet material includes domes impressed throughout the material to increase reflective dissipation effect.

10 Claims, 4 Drawing Figures

BIRD FRIGHTENING DEVICES

This invention relates to a Bird Scare or Bird Frightening Devices.

It is an extremely well known problem that many growing plants and fruits are vulnerable to bird attack and destruction by birds.

Numerous attempts have hitherto been made to propose means by which birds can be effectively and economically kept clear of a particular environment.

It is known for instance to cover the area with a net that thereby provides physical constraint but apart from the cost, enormous time and effort involved in using and locating nets makes these a very less preferred option.

Devices which are activated from an external power supply are known, but recalling that such devices must operate at the very least over many days or weeks and further that many might be required to effectively cover a vulnerable area means that firstly our supply and maintenance of power can be a significant difficulty especially if batteries are involved, and secondly with motor driven devices or other power operated devices, the cost becomes a very significant prohibiting item.

Devices which hang from the branches of trees and which are expected to move when there is wind, work either because there is often a rattling noise or they will cause some flashing effect.

Such devices as of this last type while relatively common because of their economy, have also not been found to be highly effective and it is in relation to these types of devices that this present invention relates.

A very significant study has been conducted as to providing for an effective Bird Scare which will not need external power which can be supplied very economically and which will be relatively long lasting in its effective deterant effect.

A first significant difficulty with devices of this type is that unless they are caused to move, there will be no flashing reflection effect and at least during such period one would not expect the Bird Scares to be effective.

During my observations, I have observed that birds seen to most aggressively feed soon after first morning light and just before late evening dusk.

I have further observed that it is during these times negligible wind and for the period, the birds seen to be able to attack the fruit with impunity and this can on most occasions be sufficient period for many fruits to be economically destroyed.

I have observed that on most of the occasions where there is apparent negligeable wind, there seems to be a rising draft and of course the birds themselves from the vicinity can provide disturbances which could be used to be of assistance.

Appropriate to this invention therefore I have first proposed a device useful as a Bird Scare which is such that when supported appropriately, it will be induced to rotate and otherwise move in the very lightest of rising draughts of a type that does occur in the circumstances discussed.

While such a demand is not of itself difficult to meet, the further significant difficulty arises when it is realised that the same Bird Scare Device which obviously has some reflective surface, must also be sensitive and be induced to rotate through a full range of winds which will normally hit the Bird Scare Device horizontally, and then finally, when stronger winds are encountered, the device must not only continue to provide reflective protection against birds but also must be able to withstand long periods being buffeted and driven by in fact very high winds without undue damage.

In a sense the requirements of the one contradicting entirely the requirements of the other and have hitherto suggested that it may not be possible to provide an effective Bird Scare achieving the general object herein expressed.

According to one form of this invention this can be said to reside in a Bird Scare comprising a sheet of material having a highly reflective surface thereon and support means incorporating a swivel such that when the sheet of material is supported appropriately for Bird Scaring purposes, the sheet of material can rotate while being attached to one part of the swivel while allowing te remainder of the swivel to remain stationary.

The significance of this feature may not at first be readily apparant. In higher winds, if a sheet having a reflective surface is supported as has been hitherto the case by a thread or string, the thread or string very quickly winds to a limit which then impedes further rotation of the sheet material.

Rotation of itself is a protecting mechanism in that the rotating sheet of material with a gyroscopical effect will stay more or less constantly orientated and stable in position even with quite significantly differing gusts of wind.

If this does not occur where for instance the cord supporting the sheet is wound up fully, the sheet then becomes vulnerable to random buffeting and apart from persistant potential random movements which can have the effect of bending and impacting the sheet material against the supporting branches of a tree or the like, there is a very good chance that the sheet material will be blown into an interlocking relationship with some adjacent limbs.

To solve this problem would require manufacture of the sheet material of a very solid and well constructed sheet with the result that such an article would be highly resistant because of its own mass and innateness to moving with very light airs.

By the superficially simple device of providing a swivel, this allows for the construction of the sheet material to be significantly lighter in gauge which improves its sensitivity at the lower end of the wind range and in light airs very markedly.

It is implicit that any sheet material is shaped to promote rotation under at least modest winds.

The real difficulty however is to induce a sheet of material to move and particularly rotate when the very lightest of rising air strikes the sheet of material.

This has been achieved by providing that the sheet of material is of elongate proportions with the support incorporating a swivel at a narrower side, and the sheet of material being twisted about the axis of rotation of the elongate sheet material.

In most cases this would be an axis extending through an axis of the swivel support and the centre of gravity of the sheet material.

By having a twist, when the sheet material is being of elongate dimensions hangs freely from the swivel joint, the rising air has been found to gently engage the sheet material which can now be of extremely light gauge and cause this to rotate with the result of course of being able to provide a random flashing reflective effect.

The problem however is that as the wind in the conventional sense rises, the sheet material has hitherto been rotating in an opposite direction howbeit extremely slowly and there can be found a balancing situation where the pressures from a horizontal wind might counter the rotational effort being caused by the rising air.

According to a further aspect of this invention then there is proposed a Bird Scare comprising a sheet of material having at least a substantially highly light reflective surface and being of elongate shape and being attached through a connector to a first side of a swivel, and a tie secured to a second side of the swivel, the attachment to the sheet of material being at a narrower edge of the elongate shape of the sheet, the sheet including a shape providing a twist about a rotational axis, the twist being such as to induce rotation of the sheet in gently rising air when the sheet is freely hanging from the flexible connector, the sheet shape further including a curved portion this being seen to be curved when measured along a direction transverse to the said rotational axis, such curved portion being such as to induce rotation of the sheet in light winds where substantially transverse to the said rotational axis.

Preferably, the curved portion in fact includes the two elongate edges which are oppositely positioned then curved to project in opposite directions.

In this way, the smallest of breezes can impinge on one of the edges more effectively than the other and effect rotational results.

The theories as to why flashing lights have a deterrent effect on birds have been proposed but from by own observations and trails, I believe that a bird can become sensitive to the flashing of light through the eyes of a larger predator bird.

The smaller bird becomes highly sensitive to decting such accidental refraction of light through the eye of the predator and of course such flashing can be seen from a long way off and would give a smaller bird much greater opportunity to avoid conflict.

It has been found that if a plurality of dome shapes are impressed into the sheet then these can have the effect of firstly reflecting but secondarily reflecting over a broadly divergent angle the reflection of typically the sun so that possible the effect is to induce a suspicion in the bird of many eyes of predators.

Consistent with this rationale, it has been discovered that the overall size of the sheet and the proportion of width to length can have a bearing upon the more successful use of such a device and furthermore if the overall weight of the device can be kept very small then of course there is far greater sensitivity to light airs provided once again that the device can withstand the much higher winds.

A preferred example has incorporated a width of 50 mm and a length of 200 mm where the perimeter is of rectilinear shape this shape and size approximating the silhouette area of a typical predator bird. A weight of 4 grams has been achievable with these dimensions with a 10° twsist from one end to the other along the elongate direction.

For a better understanding of this invention this will now be described with reference to a preferred embodiment with the assistance of drawings.

BRIEF DESCRIPTION OF THE DRAWINGS

as shown in Fig. 1;

Figure 1:
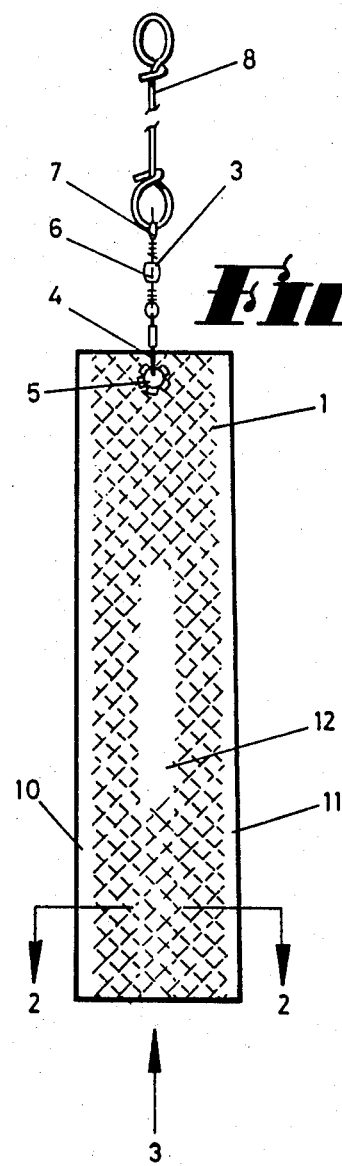
FIG. 1 is a side elevation of the preferred embodiment.

The Bird Scare according to this embodiment comprises a sheet of aluminium which is of a medium hardness in grade and of a gauge such that a rectilinear sheet having the dimensions of 50 mm by 200 mm will have an approximate weight of 4 grams.

From a top end at 1. to a botton end at 2. the otherwise substantially planar sheet of aluminium is twisted so that over a distance of 200 mm the direction of alignment of the width of the sheet material will turn through 10%.

The sheet of aluminium has a shape which is of elongate proportions and at a narrower end thereof is supported by a coupling which will allow the sheet to hang so that it is substantially all below the support location.

The support for the sheet includes a swivel 3. which has a lowermost hook 4. which engages through with interlocking relationship aperture 5. in the uppermost end of the sheet material at 1. The aperture 5. has a reinforcement ferrule the purpose of which is to reinforce the otherwise vulnerable rear edge of the aperture comprised of the aluminium sheet The swivel includes housing 6. within which two disconnected ends are located so as to enable both of these to swivel independently one from the other and thereby provide a relatively easily pivotable interconnection. In strong winds, the speed with which the parts will pivot relatively one with respect to the other can be very high and it has been found in practice that the highest quality of bearing with a lubricant that can withstand high temperatures and high speed is important. The importance of this will be appreciated when it is remembered that if the bearing does cease up, this will lock the sheet of aluminium from rotation.

An upper end of the swivel 3. includes an eye 7. and to this is secured a deformable wire 8. adapted to provide for appropriate interlocking engagement with respect to the branch of a tree such as that as shown at 9. or any appropriate support.

In a further instance which has not been shown in the drawings, there has been provided along a row of vines, a separate cable, and a plurality of Bird Scares according to this embodiment have been supported in distributed arrangement there along at intervals of about 2 feet apart.

Referring further to this embodiment, along each longer side there is provided a curved portion the shape of which is such to induce rotation of the sheet about an axis of rotation 12. The curved portion in each case is achieved by turning of the edge part at typically 10. and 11. so that at the outermost portion of the edge, this is turned through 90° so that there is a scoop shape.

The aluminium sheet as has been previously said must be selected so that it will be sufficiently light to move in even the lightest of rising air but at the same time be strong enough to resist fracturing after extended periods of rotation at very high velocities.

A sheet material has been found which has been effective for this purpose and this has been a sheet having a thickness of 0.15 mm the material being identified as an aluminium alloy 3004 purchasable from the Comalco Company in Australia the material having a temper H18 and being bright on both sides.

The impression of dome shapes in a consistent regular pattern over most of the surface area between the curved portions on the longer sides has the additional effect of stiffening the sheet material overall which of course is also the effect of the curved portions along each longer edge.

Figure 2:
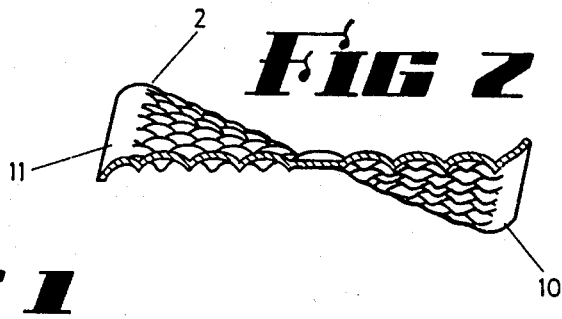
FIG. 2 is a cross section along the lines 2.2.
Figure 3:
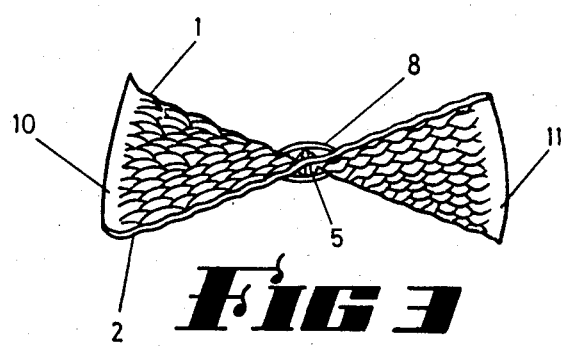
FIG. 3 is an end view of the preferred embodiment as shown in FIG. 1.
Figure 4:
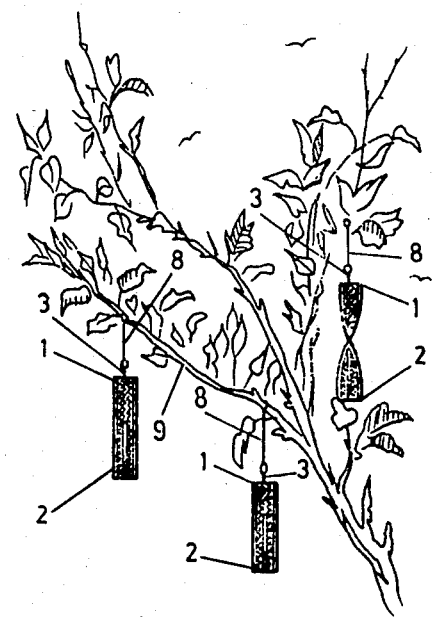
FIG. 4 is a perspective view of articles according to the prefered embodiment being located appropriately on a tree for bird scaring purposes.

The dome shape can be especially seen on FIGS. 2. and 3. in which there is on the one side a dome shape and on the other a dimpling effect.

It has been found that the dome shape with the approximate distribution shown in the several drawings seems to provide a similar reflective effect to that at least observable to a bird as that of another bird's eye such as a predator.

By having such a dome shape and having this repeated over such a wide area, it will be appreciated that the angle of the sun which is to be reflected can come from a broadly differing direction but in any event this will be caught and reflected over one again a wide area because of the divergent effect of the dome shapes.

Finally, in relation to the description, reference has been made to the fact that a very important aspect is the swivel and that this must be able to withstand very long sustained rotation.

It has been extremely difficult to find such a commercially available swivel but as this is such an important aspect of the invention it is to be noted that such a swivel is available and is distributed throughout at least Australia under the Trade Mark "Good Sport" No. 2 Ball Bearing Swivel and from the label it is indicated that it is manufactured in Japan and in the State of South Australia it can be obtained from S. A. Fishing Tackle Agencies, 210a Grange Road, Kidman Park, South Australia.

The problem of bird deterrent and scaring is an extremely serious one and affects the economic viability of large sections of commercial fruit growing operations.

In experiments thus far the device according to the embodiment was located at about 2 feet separation intervals throughout a tree having just ripening fruit in the vicinity of water and of high trees making this fruit extremely vulnerable to bird attack. Hitherto, bird attacks had destroyed any commercial viability of fruit being taken from the tree.

Subsequent to location of the Bird Scares according to this embodiment which was located in a suburaban area in the township of Adelaide in South Australia, there was found to be very minimal bird attack on several pieces of fruit on one edge of the tree which left almost all of the fruit during its full ripening period without attack and able to reach commercial value which for the first time in respect of that tree was achieved providing significant economic benefit.

I claim:

1. A Bird Scare comprising a sheet of material having at least over a substantial portion of the surface a highly light reflective finish, and being of elongate shape which sheet is attached through a connector to a first side of a swivel, and a tie secured to a second side of the swivel, the attachment between the sheet and the swivel being at a narrower edge of the elongate shape of the sheet, the sheet including a shape providing a twist about an axis extending from the point of attachment in the elongate direction of the sheet, such twist being such as to induce rotation of the sheet in gently rising air when the sheet is freely hanging, the sheet shape further including a curved edge portion when measured along a direction transverse to the said axis, such curved portion being such as to induce rotation of the sheet in light winds when such winds are directed in a substantially transverse direction to the said axis.

2. A Bird Scare as in claim 1 wherein the sheet of material incorporates a plurality of dome shapes distributed throughout the sheet.

3. A Bird Scare as in claim 1 in which the sheet includes a said curved portion at each of two opposite sides which sides are the longer of the sides defining the elongate shape, and are of a distinctly bent shape, the direction of bend of such shape for one of the sides being opposite that of the other side.

4. A Bird Scare as in claim 1 wherein the twist along the elongate direction of the sheet is such that at one end the orientation differs from the orientation at the other end by the number of degrees within the range 5° to 60°.

5. A Bird Scare as in claim 3 wherein before twisting the shape of the sheet being elongate is rectilinear and has its longer sides at least twice the length of the narrower width of the sheet.

6. A Bird Scare as in claim 5, in which the length is approximately four times the width.

7. A Bird Scare as in claim 6 wherein the size of the sheet of material is such that it is similar to that of the silhouette area of a larger bird.

8. A Bird Scare according to claim 7 wherein the sheet of material comprises a medium hard aluminium having a gauge of approximately 0.15 mm in thickness and having before twisting a rectilinear dimension in which the smaller sides are of approximately 50 mm in width and the longer sides are of approximately 200 mm in length.

9. A Bird Scare according to claim 3 wherein said sheet is made from aluminum and the weight of said sheet is approximately 4 grams.

10. A Bird Scare comprising a sheet of material having at least over a substantial portion of the surface a highly light reflective finish, and being of elongate shape which sheet is attached through a connector to a first side of a ball bearing swivel, and a tie secured to a second side of the swivel, the attachment between the sheet and the swivel being at a narrower edge of the elongate shape of the sheet, the sheet including a shape providing a twist about an axis extending from the point of attachment in the elongate direction of the sheet, such twist being such as to induce rotation of the sheet in gently rising air when the sheet is freely hanging, the sheet shape further including curved edge portions when measured along a direction transverse to the said axis, such curved portions being such as to induce rotation of the sheet in light winds when such winds are directed in a substantially transverse direction to the said axis, and said sheet of material having a plurality of dome shapes formed therein throughout center areas of said sheet.

* * * * *